(12) United States Patent
Aritomi

(10) Patent No.: US 11,847,372 B2
(45) Date of Patent: Dec. 19, 2023

(54) SYSTEM AND METHOD OF CONTROLLING SYSTEM

(71) Applicant: CANON KABUSHIKI KAISHA, Tokyo (JP)

(72) Inventor: Masanori Aritomi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/716,890

(22) Filed: Apr. 8, 2022

(65) Prior Publication Data

US 2022/0334785 A1 Oct. 20, 2022

(30) Foreign Application Priority Data

Apr. 15, 2021 (JP) ................................ 2021-068924

(51) Int. Cl.
*G06F 3/12* (2006.01)

(52) U.S. Cl.
CPC .......... *G06F 3/1267* (2013.01); *G06F 3/1204* (2013.01); *G06F 3/1272* (2013.01); *G06F 3/1292* (2013.01)

(58) Field of Classification Search
None
See application file for complete search history.

(56) References Cited

U.S. PATENT DOCUMENTS

| 2017/0318167 | A1* | 11/2017 | Shimizu | ................ | G06F 3/1286 |
| 2019/0258431 | A1* | 8/2019 | Yamamoto | ............. | H04L 67/02 |
| 2020/0104085 | A1* | 4/2020 | Sako | .................. | H04N 1/00877 |

FOREIGN PATENT DOCUMENTS

JP 2018206278 A 12/2018

* cited by examiner

*Primary Examiner* — Frantz Bataille
(74) *Attorney, Agent, or Firm* — CANON U.S.A., INC. IP Division

(57) ABSTRACT

A system according to exemplary embodiments includes an information processing apparatus and a cloud print service (CPS) associated with a company tenant. The information processing apparatus determines whether a client terminal having received a print request performs remote connection, and transmits a result of determination and print job data corresponding to the print request to the CPS. The CPS causes another CPS that is associated with a public tenant and connected to the CPS via a network to hold the print job data transmitted from the information processing apparatus based on the result of the determination transmitted from the information processing apparatus.

5 Claims, 13 Drawing Sheets

FIG.8

| PRINT REPORT | | | | | | |
|---|---|---|---|---|---|---|
| JOB NAME | COLOR | PAGE | SIZE | ... | REQUEST SESSION | 801 |
| WORD DOC | C | 6 | A4 | | REMOTE | 802 |
| EXCEL FORM | M | 1 | A3 | | | |
| SPEC SHEET | C | 12 | LETTER | | | |

800

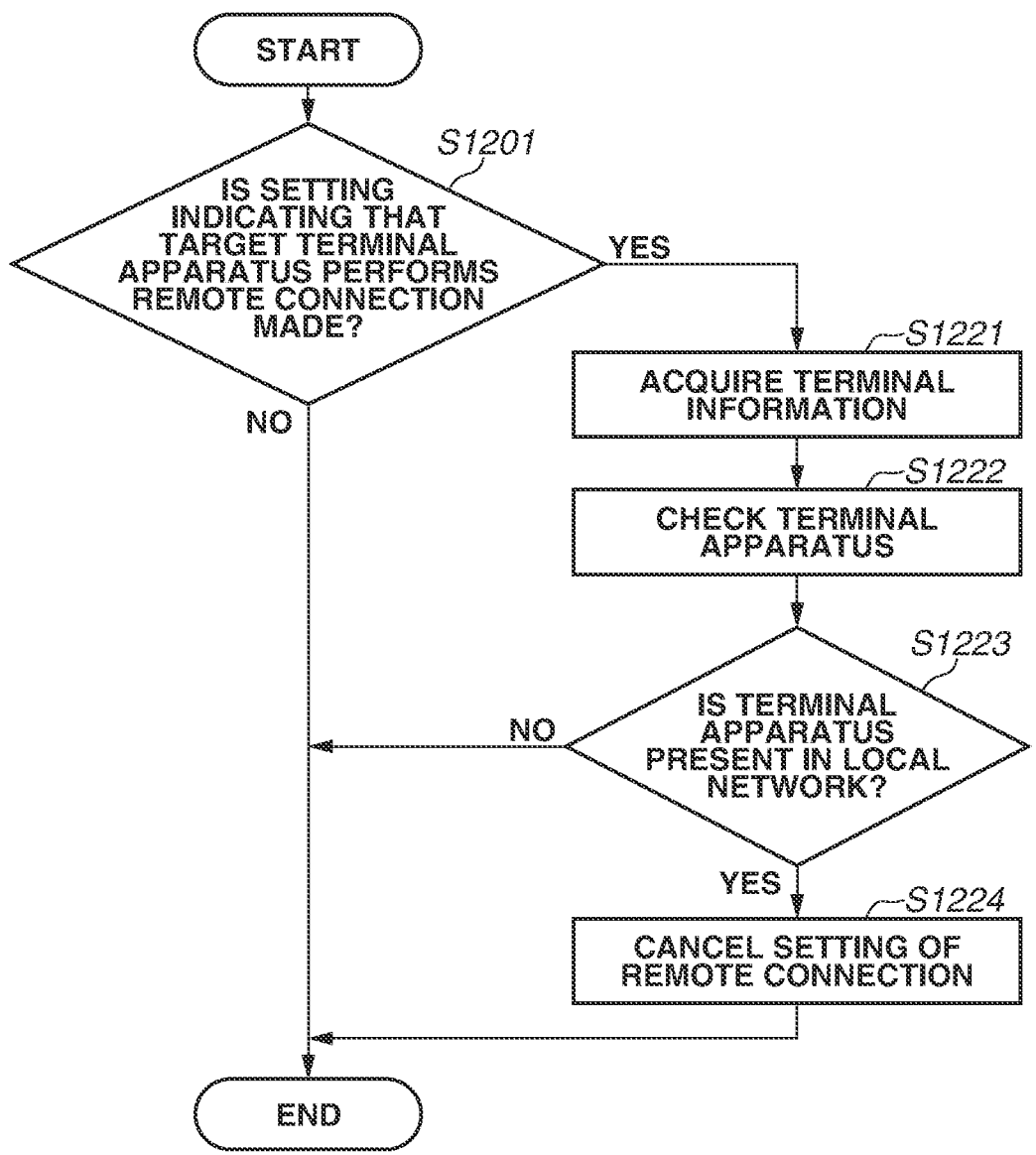

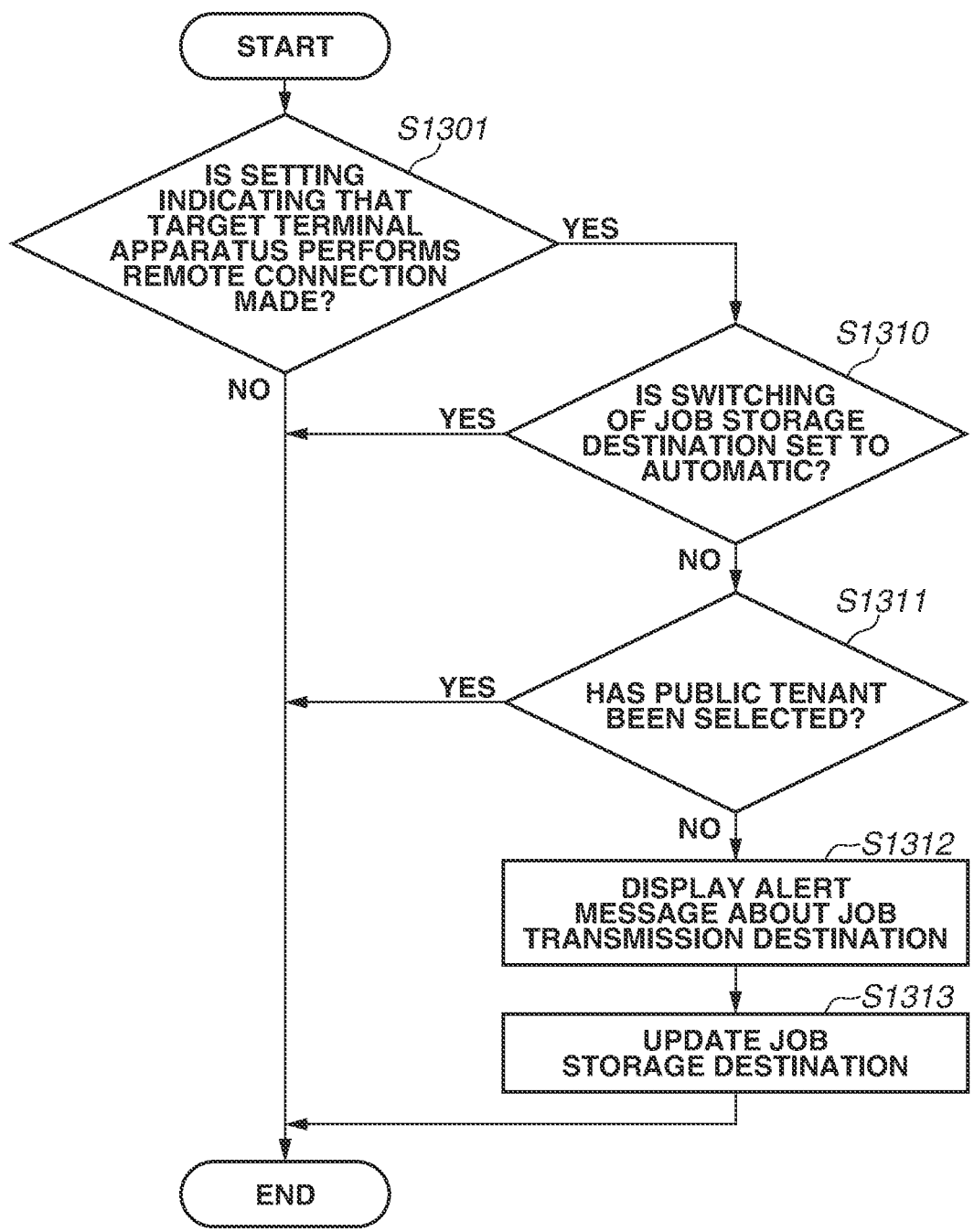

SYSTEM AND METHOD OF CONTROLLING SYSTEM

BACKGROUND

Field of the Disclosure

The present disclosure relates to a system and a method of controlling the system.

Description of the Related Art

In recent years, along with realization of what is called a cloud computing technique that provides computer resources in a form of service via a network such as the Internet, various kinds of service can be provided via the network. As an example of what is called a cloud service, a cloud print service (CPS) that receives a print request via the network and transmits a print job corresponding to the request to a desired image forming apparatus is known. Specific examples of the CPS include Google Cloud Print®, Microsoft Hybrid Cloud Print®, and uniFLOW Online®.

A printing system of the CPS exemplified above enables transmission of a print job to an image forming apparatus via the network. Thus, a user can request an image forming apparatus installed in a remote location to perform printing. Japanese Patent Application Laid-Open No. 2018-206278 discusses an example of a printing system that transmits a print job to an image forming apparatus in each location by using a server to cause the image forming apparatus to perform printing.

In the present disclosure, a tenant corresponds to a service system developed by the user on the cloud, and includes a storage area accessible only by the user. For example, in the case of a company A tenant of a CPS used by a company A, employees working in the company A are registered as users, and an image forming apparatus under the control of the company A is registered and used. As a result, a user in the company A can cause the image forming apparatus under the control of the company A to perform printing by issuing a print instruction to the image forming apparatus from an in-house client terminal.

In the printing system using the CPS exemplified above, multitenant management can be implemented by registering a user and an image forming apparatus for each tenant, while independent operation for each tenant is also possible. Further, a mode in which the CPSs of tenants indirectly cooperate with each other via a CPS called a public print service to cause a plurality of printing systems to cooperate with each other is also envisioned.

On the other hand, under a situation where the plurality of printing systems cooperates with each other, the user may use a client terminal under the control of another tenant to request printing of data managed by the tenant of the company to which the user belongs. In such a situation, however, it is difficult for a CPS associated with one of tenants to refer to a print job held by a CPS associated with the other tenant. As a result, execution of printing may be limited.

SUMMARY

Embodiments of the present disclosure are directed to a technique enabling cooperation of a plurality of printing systems in a more suitable mode.

According to embodiments of the present disclosure, a system includes an information processing apparatus configured to receive remote connection from a client terminal, and a first cloud print service configured to cooperate with the information processing apparatus, wherein the information processing apparatus includes first one or more memories storing a first set of instructions, and first one or more processors that execute the first set of instructions to determine whether the client terminal having received a print request performs remote connection to the information processing apparatus, and transmit a result of determination and print job data corresponding to the print request to the first cloud print service, wherein the first cloud print service includes second one or more memories storing a second set of instructions, and second one or more processors that execute the second set of instructions to, in a case where the transmitted result of the determination indicates that the client terminal performs the remote connection to the information processing apparatus, transmit the print job data transmitted from the information processing apparatus to a second cloud print service, and wherein the transmitted print job data is held by the second cloud print service.

Further features of the present disclosure will become apparent from the following description of exemplary embodiments with reference to the attached drawings.

BRIEF DESCRIPTION OF THE DRAWINGS

FIG. 8 is a diagram illustrating an example of history information relating to the cooperation between the printing systems.

FIG. 12 is a flowchart illustrating an example of processing by the system.

FIG. 13 is a flowchart illustrating an example of processing by the system.

DESCRIPTION OF THE EMBODIMENTS

Figure 1:
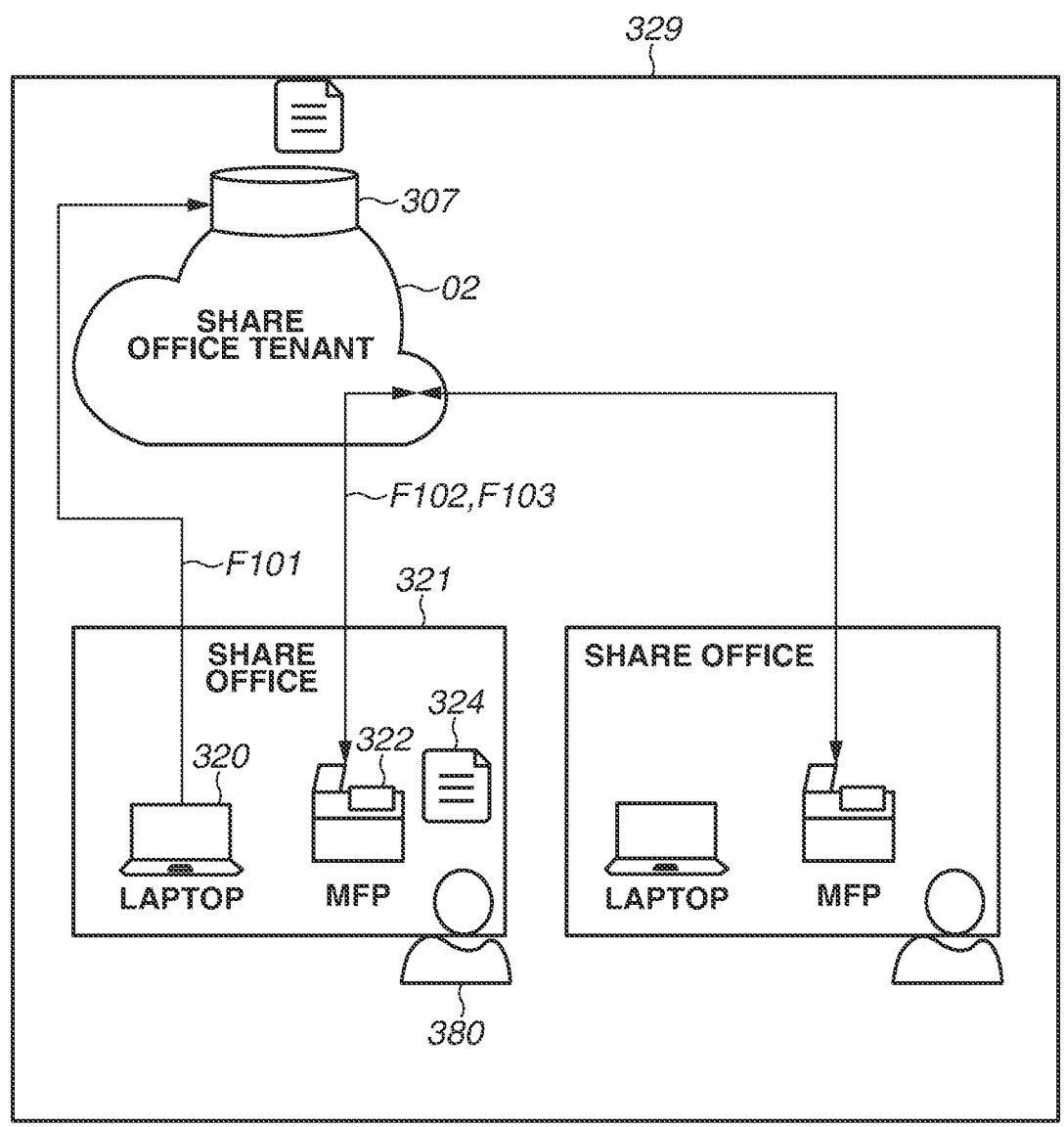
FIG. 1 is a diagram illustrating an example of a printing system according to a comparative example.

Exemplary embodiments of the present disclosure are described in detail below with reference to the accompanying drawings.

In the specification and the drawings, components having substantially the same functional configurations are denoted by the same reference numerals, and repetitive descriptions of such components are omitted.

Comparative Example

To facilitate understanding of features of a system according to the present exemplary embodiment, a summary of an example of a printing system using what is called a cloud print service (CPS) is described as a comparative example with reference to FIG. 1.

In a printing system 329 illustrated in FIG. 1, a CPS 02 associated with a tenant (hereinafter, also referred to as a share office tenant) under the control of a share office is used via a terminal apparatus 320 installed in an environment 321 of each of a plurality of share offices. In other words, in the example illustrated in FIG. 1, the CPS 02 and each of the terminal apparatus 320 and an image forming apparatus (multifunctional peripheral (MFP)) 322 installed in the environment 321 of each of the share offices are managed in association with the share office tenant.

As indicated by processing F101, the terminal apparatus 320 transmits print job data (hereinafter, also simply referred to as a print job) to the CPS 02, for example, in response to an instruction from a user 380. The CPS 02 holds the print job transmitted from the terminal apparatus 320 by storing the print job in a predetermined storage area (e.g., a storage unit 307).

In addition, as indicated by processing F102 and F103, the MFP 322 acquires the print job held by the CPS 02, performs print processing based on the print job, and outputs a print result 324, in response to an instruction from the user 380.

Since the user 380 is registered as a user of the share office tenant, the user 380 can use the CPS 02 under the control of the share office tenant via the terminal apparatus 320 from another share office.

<Hardware Configuration>

Figure 2:
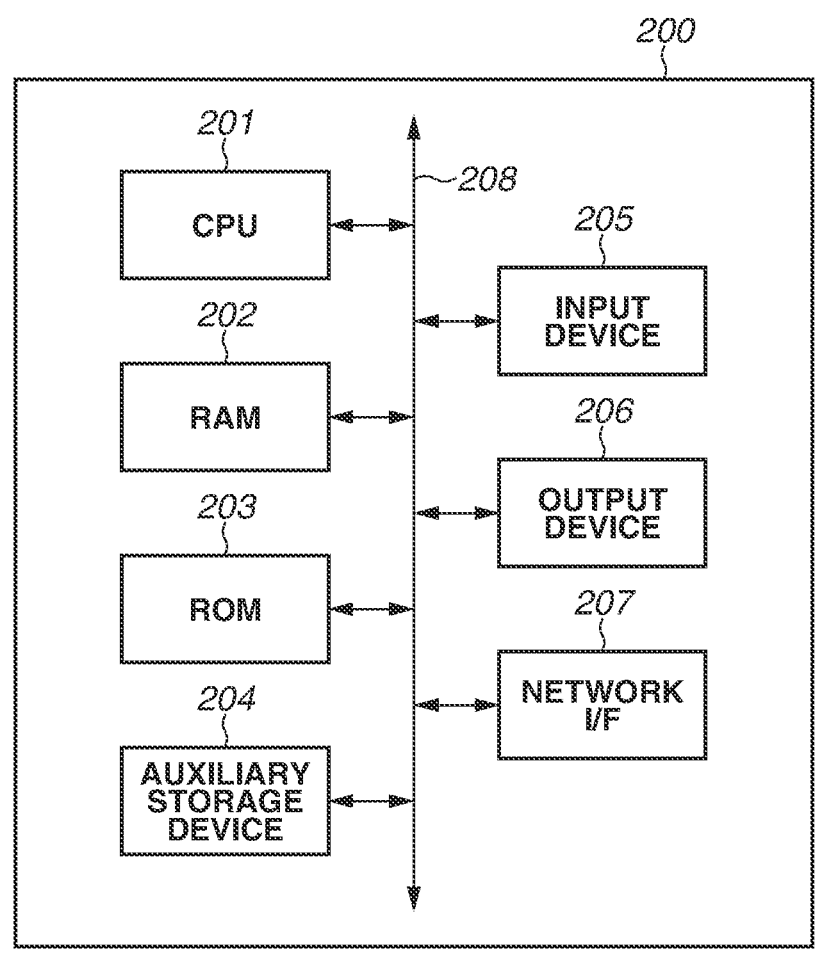
FIG. 2 is a diagram illustrating an example of a hardware configuration of an information processing apparatus.

An example of a hardware configuration of an information processing apparatus 200 included in a system according to an exemplary embodiment of the present disclosure is described with reference to FIG. 2. The information processing apparatus 200 according to the present exemplary embodiment includes a central processing unit (CPU) 201, a random access memory (RAM) 202, and a read only memory (ROM) 203. The information processing apparatus 200 further includes an auxiliary storage device 204, and a network interface (I/F) 207. The information processing apparatus 200 may further include at least one of an input device 205 and an output device 206. The CPU 201, the RAM 202, the ROM 203, the auxiliary storage device 204, the input device 205, the output device 206, and the network I/F 207 are mutually connected via a bus 208.

The CPU 201 is a central processing device controlling various kinds of operation of the information processing apparatus 200. For example, the CPU 201 may control the whole operation of the information processing apparatus 200.

The RAM 202 is a main storage memory for the CPU 201, and is used as a work area or a temporary storage area into which various kinds of programs are loaded.

The ROM 203 stores programs (e.g., Basic Input/Output System (BIOS)) for the CPU 201 to control operation of the information processing apparatus 200 and the like.

The auxiliary storage device 204 stores an operating system (OS), which is basic software, programs for various kinds of application, and various kinds of data. The auxiliary storage device 204 can be implemented by, for example, a nonvolatile memory represented by a hard disk drive (HDD) and a solid state drive (SDD).

The network I/F 207 is an interface for connecting to a predetermined network (e.g., a local area network (LAN) or the Internet), to communicate with an external apparatus via the network.

The input device 205 is a device for receiving an instruction from a user. The input device 205 can be implemented by, for example, a pointing device such as a mouse, and an operation device such as a keyboard and a touch panel.

The output device 206 is a device for presenting various kinds of information to the user. The output device 206 can be implemented by a display device, such as a display, that displays various kinds of display information, a screen, and the like to present information to the user.

The above-described configuration is merely an example and does not limit the hardware configuration of the information processing apparatus 200. As a specific example, some of the above-described components (e.g., at least one of the input device 205 and the output device 206) of the information processing apparatus 200 may be externally mounted on the information processing apparatus 200.

Further, a functional configuration described below with reference to FIG. 3 to FIG. 7, and processing described below with reference to FIG. 10 to FIG. 13 are implemented when the desired information processing apparatus 200 loads programs stored in the ROM and the auxiliary storage device 204 to the RAM 202 and executes the programs.

<Mode Relating to Cooperation Between Printing Systems>

A summary of an example of a mode relating to cooperation between printing systems using CPSs is described with reference to FIG. 3. In the example illustrated in FIG. 3, for example, a state where a user who is an employee of the company A having a contract with a plurality of share offices works in the company A or any of the share offices is envisioned.

Figure 3:
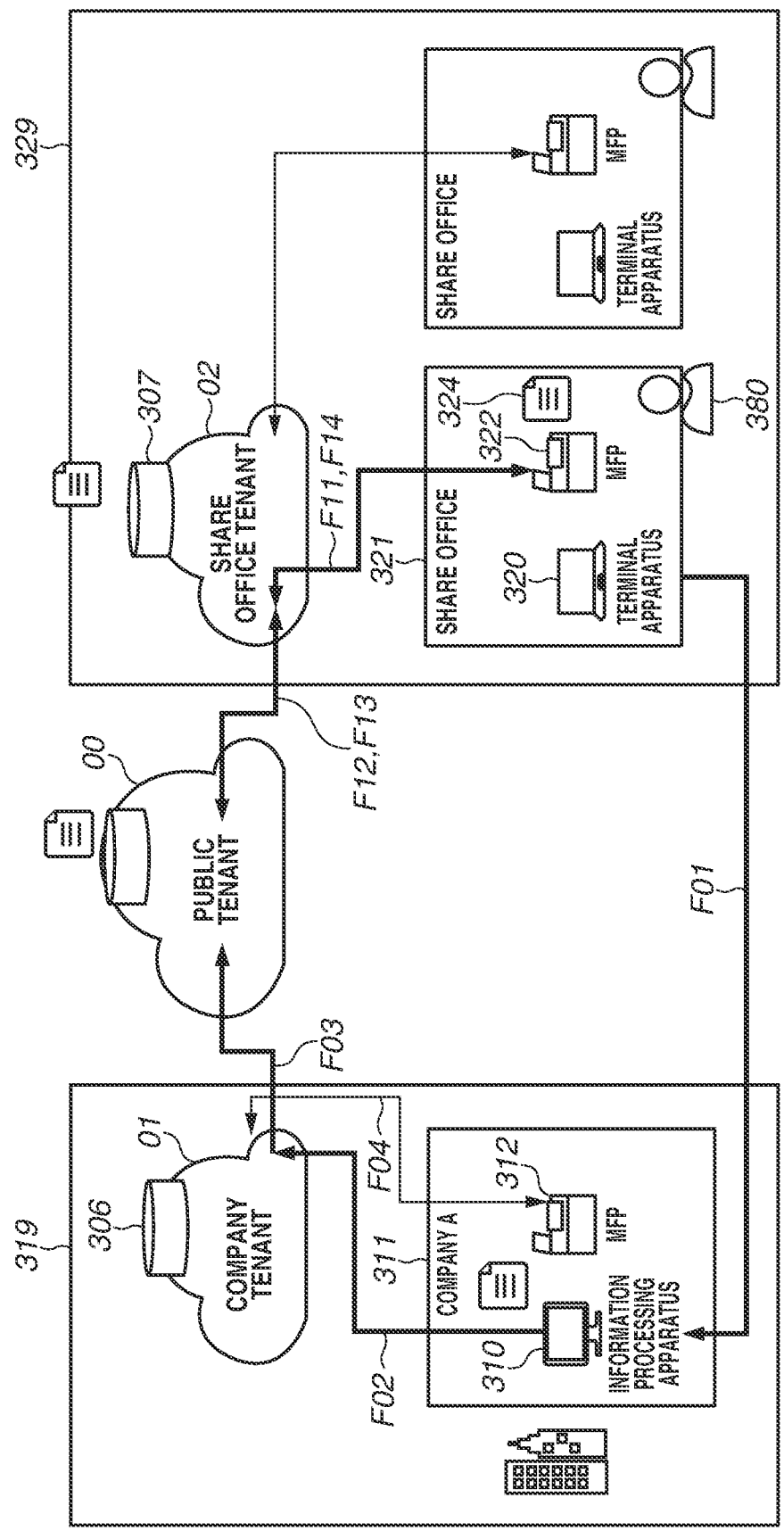
FIG. 3 is a diagram illustrating an example of a mode relating to cooperation between printing systems.
Figure 4:
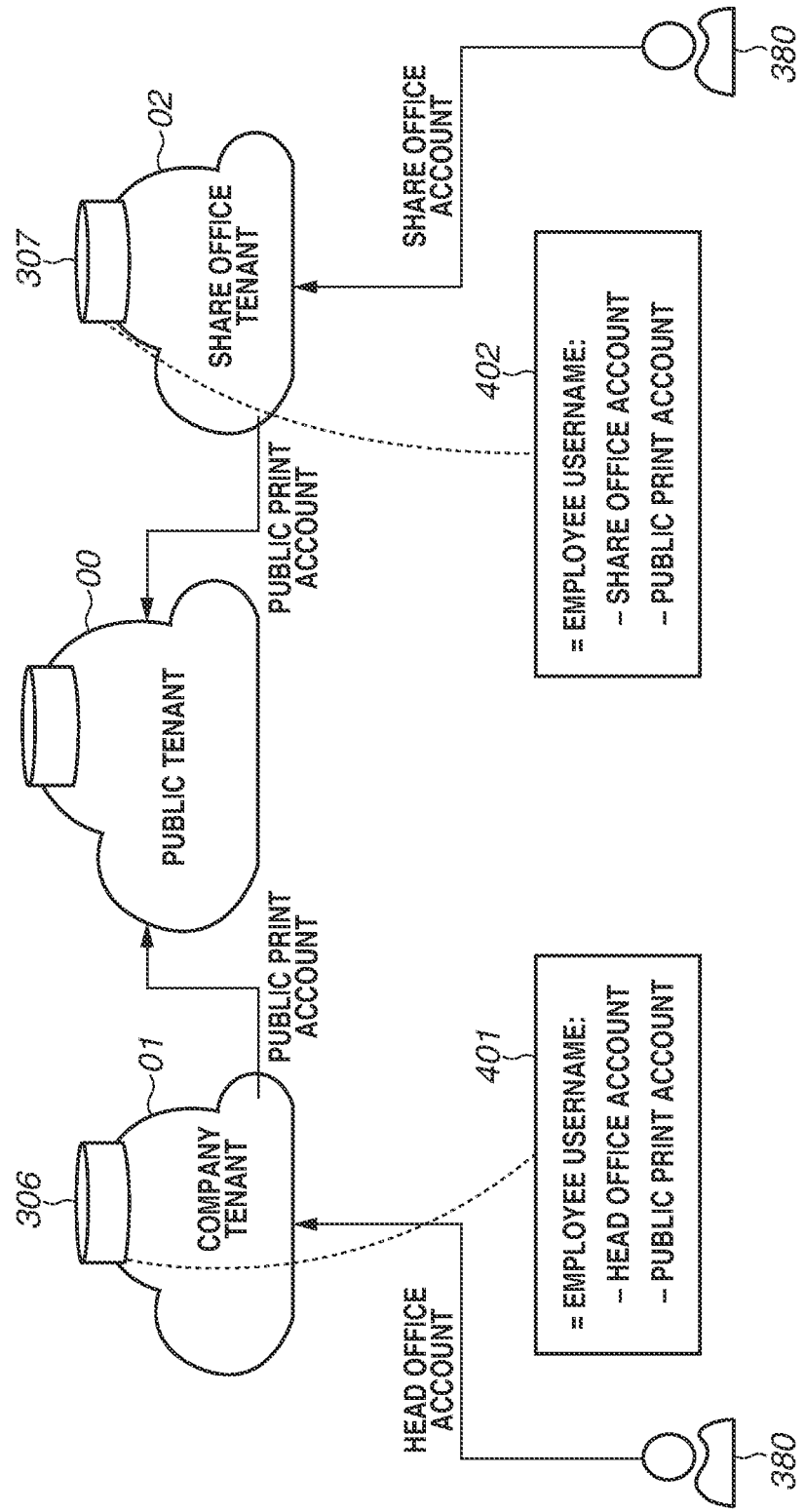
FIG. 4 is a diagram illustrating an example of an account management function.

In the example illustrated in FIG. 3, a printing system 319 corresponding to a tenant of the company A and a printing system 329 corresponding to a share office tenant are indirectly connected via a CPS 00 associated with a public tenant.

First, an example of a configuration of the printing system 319 corresponding to the tenant of the company A is described. An in-house environment 311 of the company A includes an information processing apparatus 310 for management of remote connection to an in-house network (i.e., an in-house virtual environment) of the company A, and an MFP 312 connected to the in-house network. A CPS 01 schematically illustrates a CPS accessible from the in-house environment 311 of the company A. The MFP 312 schematically illustrates an MFP installed in the in-house environment 311 of the company A. A storage unit 306 schematically illustrates a storage area where data is stored by the CPS 01 to hold various kinds of data. The CPS 01, the MFP 312, and the information processing apparatus 310 constituting the printing system 319 are associated with the tenant of the company A. The information processing apparatus 310 may be implemented as a real apparatus such as a server, or may be implemented as a virtual apparatus (e.g., virtual service) installed in what is called a virtual environment.

Next, an example of a configuration of the printing system 329 corresponding to the share office tenant is described. The environment 321 of a share office includes the terminal apparatus 320 used by the user 380 in the share office, and the MFP 322 installed in the share office.

The printing system 329 may include a plurality of environments 321 corresponding to respective different share offices. The CPS 02 schematically illustrates a CPS accessible from the environment 321 of each share office. The MFP 322 schematically illustrates an MFP installed in the environment 321 of each share office. The storage unit 307 schematically illustrates a storage area where data is stored by the CPS 02 to hold various kinds of data. The CPS 02 and the MFP 322 included in the printing system 329 are associated with the share office tenant. The terminal apparatus 320 corresponds to an example of a client terminal in the system according to the present exemplary embodiment.

In the example illustrated in FIG. 3, the user has an account set for each of the tenant of the company A, the share office tenant, and the public tenant, and can use the CPS associated with each of the tenants by signing in to each of the tenants.

In the example illustrated in FIG. 3, an example of a general procedure of processing in a case where the user working in the share office causes the MFP 322 installed in the share office to print a document managed in the in-house environment 311 is described.

As indicated by processing F01, the terminal apparatus 320 performs remote connection to the information processing apparatus 310 in response to an instruction from the user 380. As a result, the terminal apparatus 320 can access the document managed in the in-house environment 311 via the information processing apparatus 310 and can request the CPS 01 to print the document.

As indicated by processing F02, the information processing apparatus 310 transmits a print job relating to printing of the target document to the CPS 01 in response to the print request from the terminal apparatus 320.

Further, as indicated by processing F03, the CPS 01 transmits the print job transmitted from the information processing apparatus 310 to the CPS 00 associated with the public tenant. The CPS 00 corresponds to a CPS (i.e., a printing system) that acts as an intermediary in cooperation between the printing system 319 corresponding the tenant of the company A and the printing system 329 corresponding to the share office tenant. The CPS 00 holds the print job transmitted from the information processing apparatus 310 by storing the print job in a predetermined storage area.

As described above, in the system according to the present exemplary embodiment, the CPS 01 associated with the tenant of the company A is configured to cooperate with each of the information processing apparatus 310 and the CPS 00 associated with the public tenant.

As indicated by processing F11, the MFP 322 requests the CPS 02 to transmit the print job held by the CPS 00 in response to an instruction from the user 380. In response to the request from the MFP 322, the CPS 02 requests the CPS 00 to transmit the above-described print job as indicated by processing F12.

As indicated by processing F13, the CPS 00 transmits the target print job to the CPS 02 in response to the request from the CPS 02. Further, as indicated by processing F14, the CPS 02 transfers the print job transmitted from the CPS 00 to the MFP 322.

As a result, the MFP 322 installed in the environment 321 of the share office can acquire the print job relating to printing of the document managed in the in-house environment 311 of the company A, execute the printing based on the print job, and output the print result 324 of the document.

A supplementary explanation of the CPS holding the print job is provided. The print job transmitted from the in-house environment 311 of the company A is held by the CPS 01 associated with the tenant of the company A or by the CPS 00 associated with the public tenant. In other words, in the system according to the present exemplary embodiment, processing to switch a transmission destination of the print job described below is performed.

More specifically, in a case where a document managed in the in-house environment 311 of the company A is printed by the MFP 312 installed in the in-house environment 311, the CPS 01 holds the print job. In this case, the print job is transmitted from the CPS 01 to the MFP 312, and the MFP 312 performs printing.

In contrast, in a case where a document managed in the in-house environment 311 is printed by the MFP 322 installed in the environment 321 of the share office, the print job is transmitted from the CPS 01 to the CPS 00, and the CPS 00 holds the print job. In this case, as described above, the print job is transmitted from the CPS 00 to the MFP 322 via the CPS 02, and the MFP 322 performs printing.

It is difficult for the CPS 02 associated with the share office tenant to access the print job in a state where the CPS 01 associated with the tenant of the company A holds the print job. In contrast, if the CPS 00 associated with the public tenant (i.e., a cooperating tenant) holds the print job as described above, the CPS 02 can access the print job. Thus, in a case where printing of a document managed in the in-house environment 311 is requested based on remote connection from the terminal apparatus 320 installed in the environment 321 of the share office, control to cause the CPS 02 to hold the print job relating to printing of the document is applied.

<Account Management Relating to Cooperation Between Printing Systems>

An example of an account management function relating to cooperation between printing systems using CPSs is described with reference to FIG. 5.

In the system according to the present exemplary embodiment, an account of a user for an independent tenant such as a company tenant is managed in association with an account of the user for the cooperating tenant (e.g., public tenant). In other words, to start use of the printing system on the company side, the user 380 signs in to each of the company tenant and the cooperating tenant. At this time, the printing system on the company side manages identification information (e.g., username) for identification of the target user 380 in association with an access token issued in response to sign-in to each of the company tenant and the cooperating tenant.

Likewise, to start use of the printing system on the share office side, the user 380 signs in to each of the share office tenant and the cooperating tenant.

At this time, the printing system on the share office side manages the identification information (e.g., username) for identification of the user 380 in association with an access token issued in response to sign-in to each of the share office tenant and the cooperating tenant.

Figure 10:
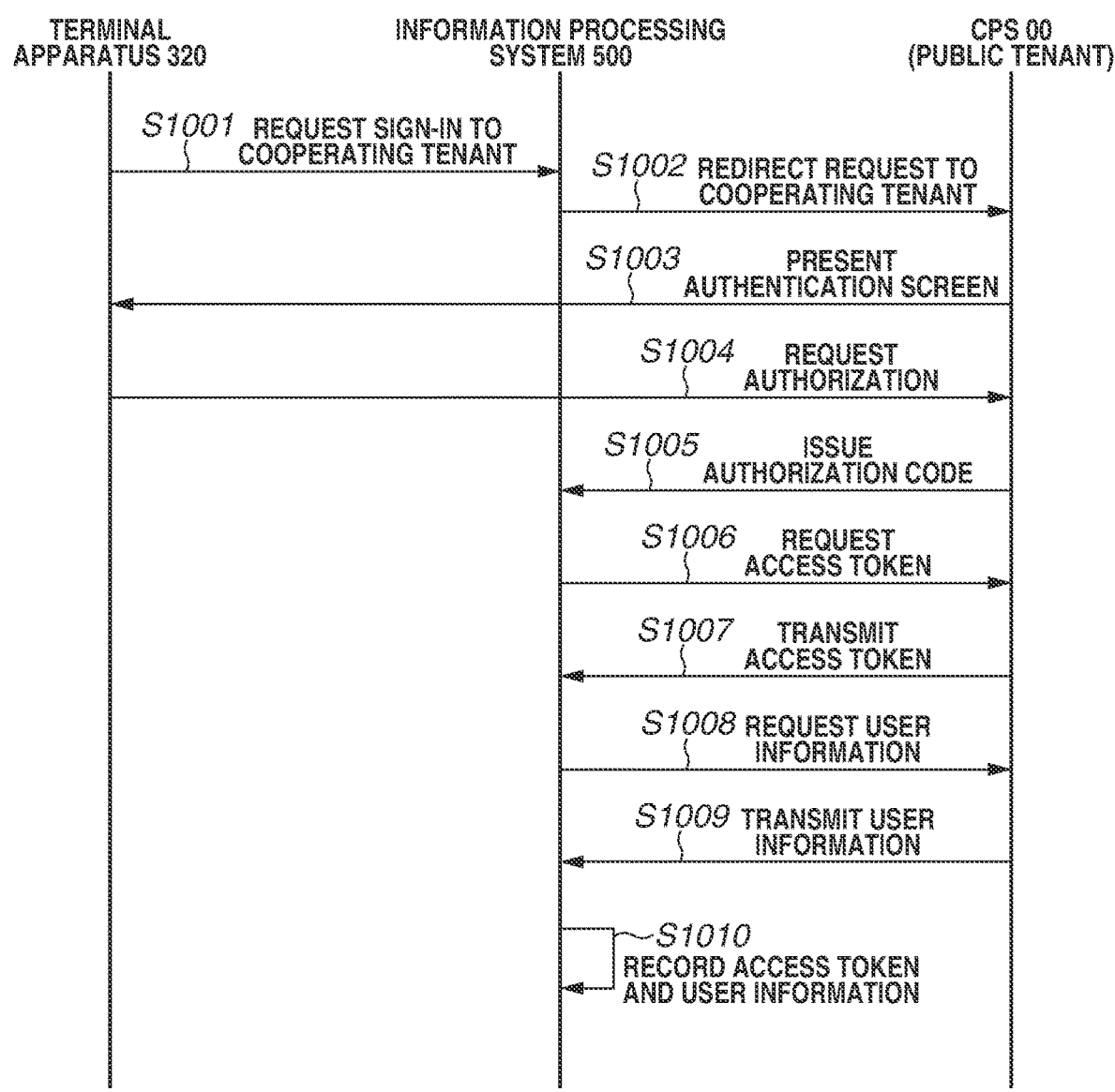
FIG. 10 is a sequence diagram illustrating an example of account setting processing.

Processing to acquire information about the user and processing to issue the access token are separately described in detail below with reference to FIG. 10. Further, hereinafter, to facilitate understanding of features of the system according to the present exemplary embodiment, description is given based on an assumption that the public tenant functions as the cooperating tenant.

As described above, in the system according to the present exemplary embodiment, among the accounts of the user 380 managed by each of the printing system on the company side and the printing system on the share office side, the account for the public tenant is common.

<Determination of Remote Connection Relating to Cooperation Between Printing Systems>

An example of a function to determine remote connection to the in-house environment by the terminal apparatus 320 under an environment where cooperation between the printing systems using the CPSs is performed is described with reference to FIG. 5.

Figure 5:
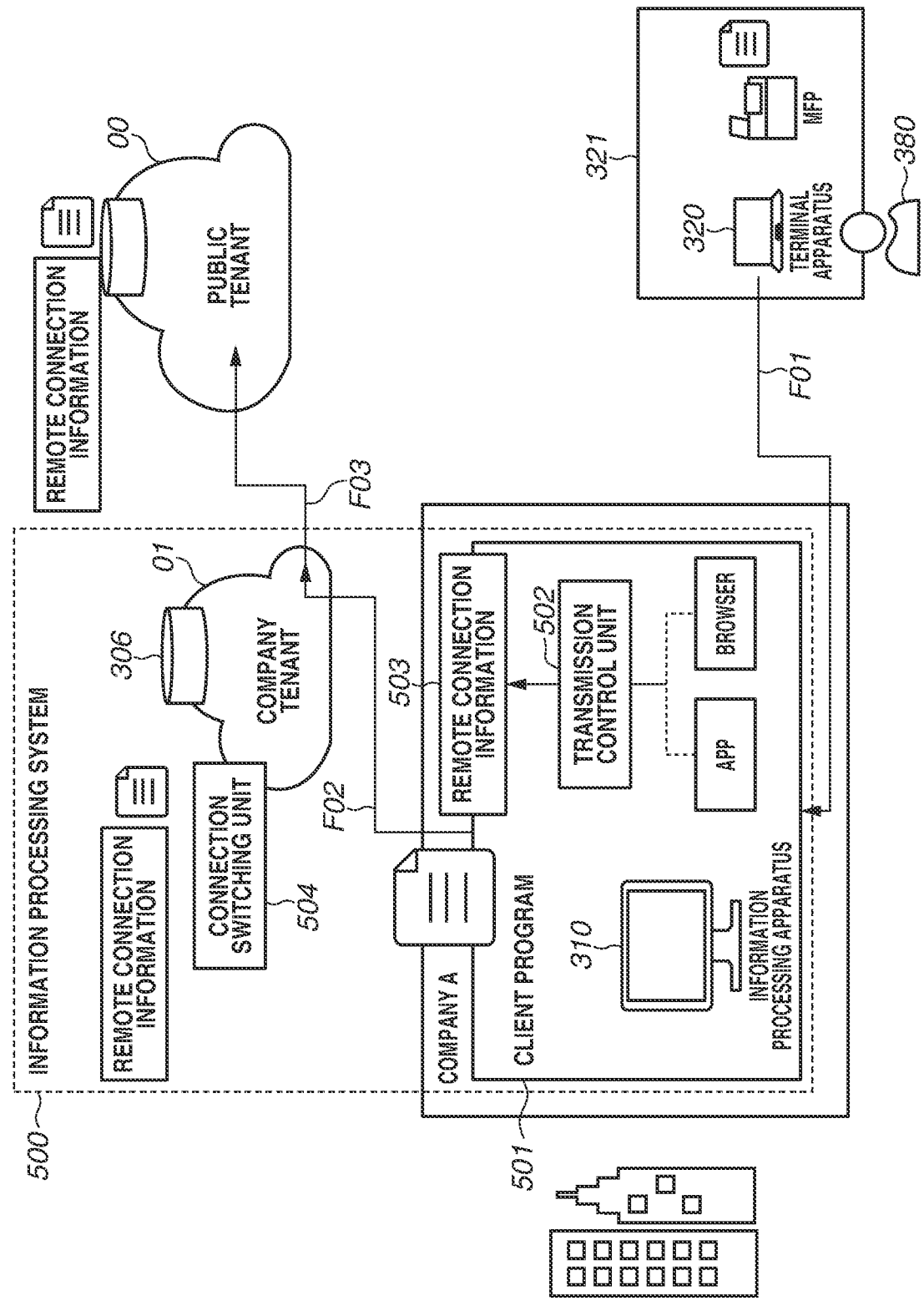
FIG. 5 is a diagram illustrating an example of a function to determine remote connection by a terminal apparatus.

In FIG. 5, an information processing system 500 corresponds to an example of the printing system on the company A side. A transmission control unit 502 illustrated in FIG. 5 is implemented when the information processing apparatus 310 included in the information processing system 500 executes a client program 501. The client program 501 can be implemented, for example, as an application operating on the information processing apparatus 310 or a browser application. A connection switching unit 504 schematically illustrates part of the function of the CPS 01 associated with the in-house tenant of the company A.

As indicated by processing F01, the terminal apparatus 320 installed in the environment 321 of the share office performs remote connection (e.g., remote desktop connection) to the information processing apparatus 310 operating in the in-house environment 311 of the company A in response to an instruction from the user 380. The transmission control unit 502 determines whether the terminal apparatus 320 performs the remote connection. In a case where the terminal apparatus 320 performs the remote connection, the transmission control unit 502 records information indicating that the terminal apparatus 320 performs the remote connection in remote connection information 503. The remote connection information 503 schematically illustrates setting information for managing setting information relating to communication with other apparatuses such as the terminal apparatus 320.

As indicated by processing F02, when receiving a print request from the terminal apparatus 320, the transmission control unit 502 transmits the remote connection information 503 and a print job corresponding to the print request to the CPS 01 associated with the company tenant of the company A.

As indicated by processing F03, when receiving the remote connection information 503, the connection switching unit 504 of the CPS 01 selectively switches a storage destination of the print job (i.e., a target that holds the print job) based on the information recorded in the remote connection information 503.

More specifically, in a case where the information indicating that the terminal apparatus 320 as a print request source performs the remote connection is recorded in the remote connection information 503, the connection switching unit 504 switches the storage destination of the print job to the CPS 00 associated with the public tenant. Thereafter, the connection switching unit 504 transmits the target print job to the CPS 00.

The CPS 00 holds the print job transmitted from the connection switching unit 504 of the CPS 01 by storing the print job in a predetermined storage area (e.g., database (DB) or storage).

As a result, the print job is held by the CPS 00 associated with the public tenant. This enables the CPS 02 associated with the share office tenant to access the print job.

The determination method is not particularly limited as long as the transmission control unit 502 can determine whether the terminal apparatus 320 performs the remote connection. For example, the transmission control unit 502 may determine whether the terminal apparatus 320 performs the remote connection by using an application programming interface (API) provided by the OS. As a specific example, in a case where the OS of the information processing apparatus 310 is Windows®, it is possible to determine whether the terminal apparatus 320 performs the remote connection by referring to Terminal Server Session property value.

Then, another example of the function to determine the remote connection by the terminal apparatus 320, under the environment where cooperation between the printing systems using the CPSs is performed, is described with reference to FIG. 6. In the example illustrated in FIG. 6, a function to determine the remote connection from a local network is added to the example illustrated in FIG. 5. Hereinafter, the example illustrated in FIG. 6 is described by particularly focusing on portions different from the example illustrated in FIG. 5, and detailed descriptions of portions substantially similar to the example illustrated in FIG. 5 are omitted.

Figure 6:
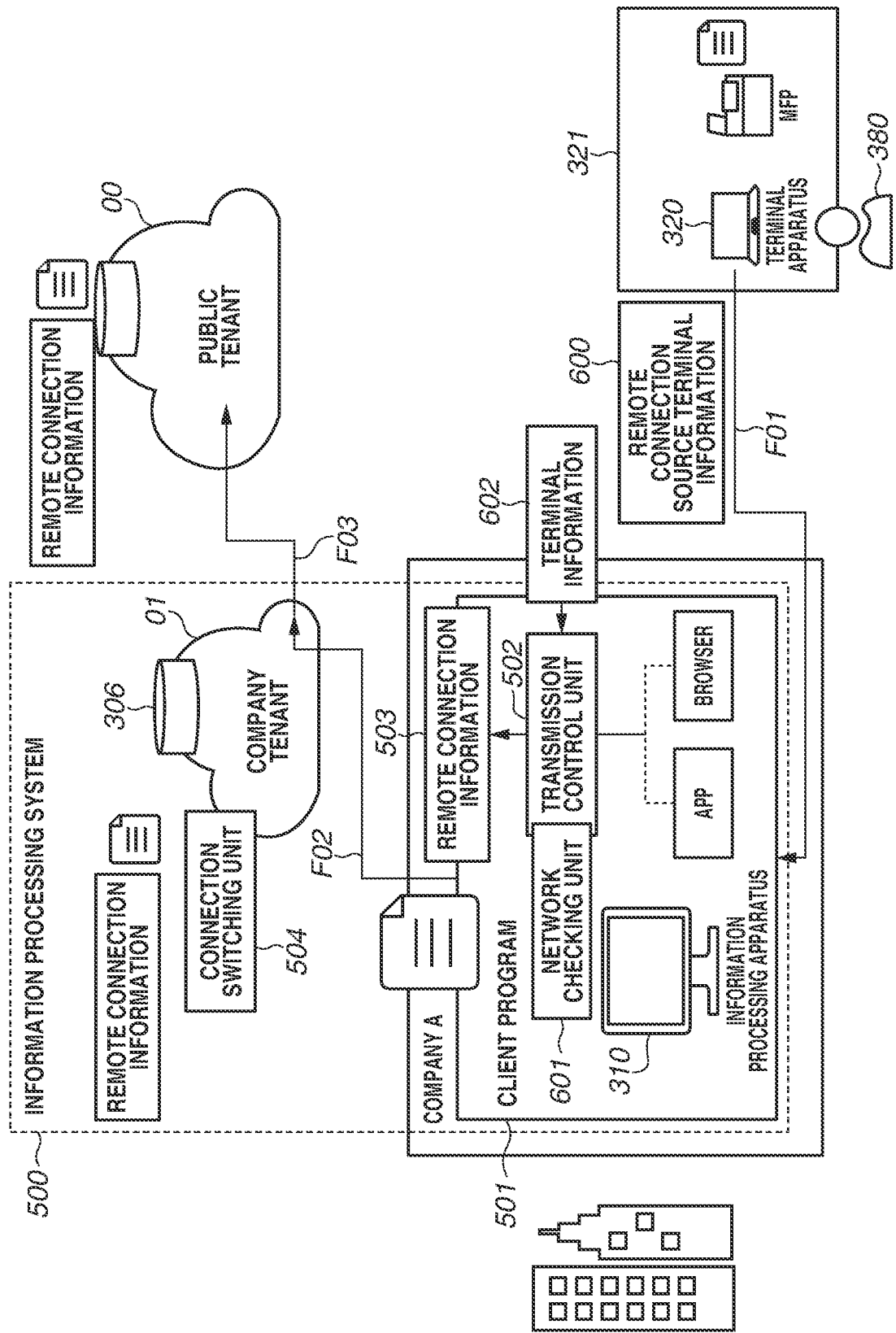
FIG. 6 is a diagram illustrating another example of the function to determine the remote connection by the terminal apparatus.

A network check unit 601 illustrated in FIG. 6 is implemented when the information processing apparatus 310 included in the information processing system 500 executes the client program 501.

More specifically, the transmission control unit 502 acquires information about the terminal apparatus 320 performing the remote connection (hereinafter, also referred to as "remote connection source terminal information 600"), from the terminal apparatus 320. The transmission control unit 502 records the acquired remote connection source terminal information 600 on the terminal apparatus 320 and terminal information on the information processing apparatus 310, in terminal information 602.

The network check unit 601 checks whether the target terminal apparatus 320 is present in a local network based on the terminal information 602. In a case where, as a result of the above-described check by the network check unit 601, it is recognized that the terminal apparatus 320 is not present in the same network (i.e., local network), the transmission control unit 502 determines that the terminal apparatus 320 performs the remote connection.

In a case where the terminal apparatus 320 performs the remote connection, the transmission control unit 502 records information indicating that the terminal apparatus 320 performs the remote connection in the remote connection information 503. Thereafter, when receiving a print request from the terminal apparatus 320, the transmission control unit 502 transmits the remote connection information 503 and a print job corresponding to the print request to the CPS 01 associated with the company tenant of the company A.

When receiving the remote connection information 503, the connection switching unit 504 of the CPS 01 selectively switches the storage destination of the print job (i.e., a target that holds the print job) based on the information recorded in the remote connection information 503. The switching processing is similar to that in the example illustrated in FIG. 5.

Further, the connection switching unit 504 may record the above-described information corresponding to the result of the determination on whether the terminal apparatus 320 performs the remote connection in predetermined history information (e.g., print history) based on the received remote connection information 503. The history information is separately described in detail below with reference to FIG. 8.

The remote connection source terminal information 600 may include information on, for example, an internet protocol (IP) address, a fully qualified domain name (FQDN), and a username. The information included in the remote connection source terminal information 600 may be acquired by, for example, an API provided by the OS. As a specific example, in the case where the OS of the information processing apparatus 310 is Windows®, the above-described information can be acquired through combination processing of WTSQuerySessionInformation ( ) API and a network command. As a more specific example, if a client name of the terminal apparatus 320 that is a print request source is transmitted to a Domain Name System (DNS) server, an IP address of the terminal apparatus 320 is returned as a response. At this time, in a case where the target client name is not present in a DNS database, the terminal apparatus 320 represented by the client name is present out of a local management domain.

Figure 7:
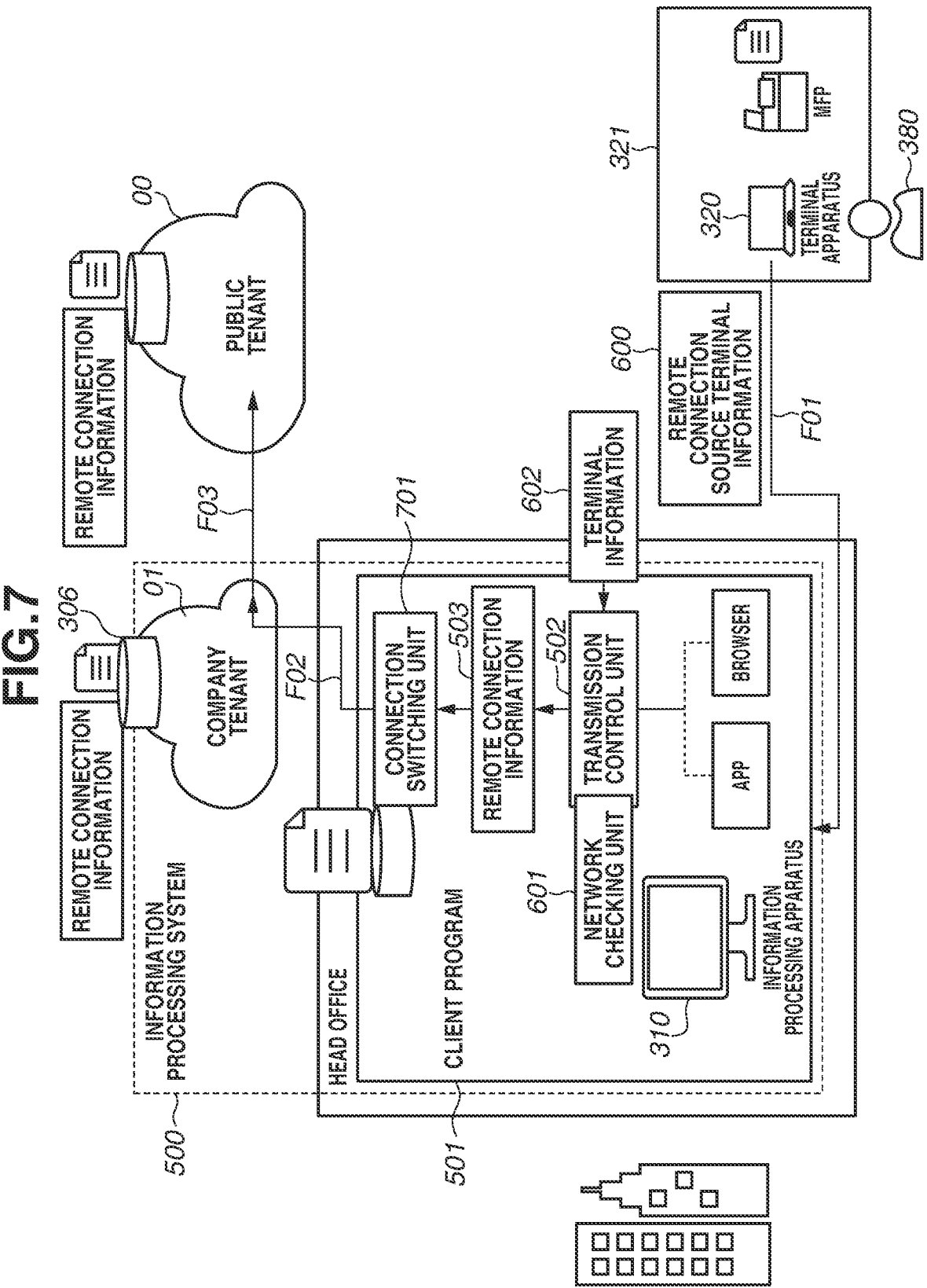
FIG. 7 is a diagram illustrating another example of the function to determine the remote connection by the terminal apparatus.

Then, another example of the function to determine the remote connection by the terminal apparatus 320, under the environment where cooperation between the printing systems using the CPSs is performed, is described with reference to FIG. 7. The example illustrated in FIG. 7 is different from the example illustrated in each of FIG. 5 and FIG. 6 in that a component (hereinafter, also referred to as a connection switching unit 701) corresponding to the connection switching unit 504 in the example illustrated in each of FIG. 5 and FIG. 6 is provided on the information processing apparatus 310 side. Operation of the connection switching unit 701 is substantially similar to that in the example illustrated in FIG. 6 except that the function is provided on the information processing apparatus 310 side.

<Print History Relating to Cooperation Between Printing Systems>

An example of the history information (hereinafter, also referred to as a print history) relating to cooperation between the printing systems using the CPSs is described with reference to FIG. 8. As described above, the connection switching unit 504 may record the information corresponding to the result of the determination on whether the terminal apparatus 320 performs the remote connection in the predetermined history information based on the received remote connection information 503.

For example, print history 800 illustrated in FIG. 8 illustrates an example of the above-described history information. In the print history 800, a job name and information about a print setting for each print job are recorded as history. Further, in the print history 800, session information (Request Session) 801 about a print request is recorded for each print job. More specifically, in a case where it is determined that the terminal apparatus 320 that is a print request source performs the remote connection, "Remote" indicating that the remote connection is performed is recorded as a setting value 802 of the session information 801.

<Alert Screen Relating to Cooperation Between Printing Systems>

Figure 9:
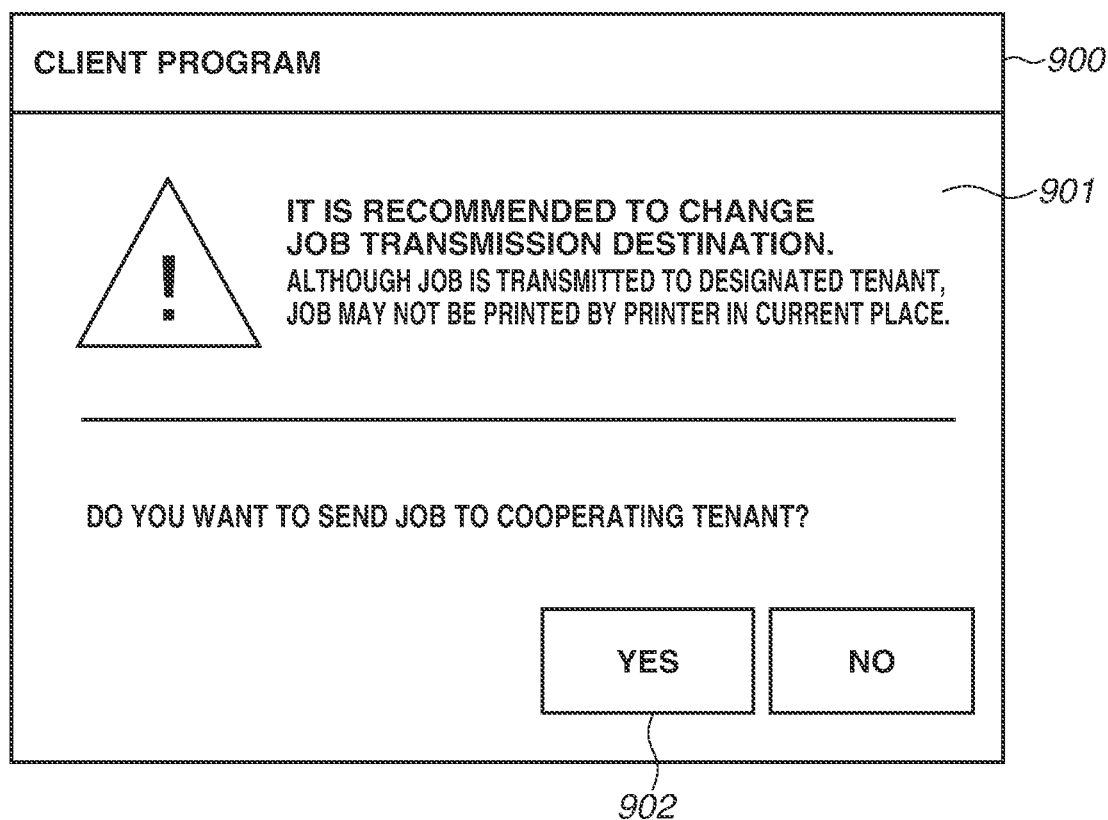
FIG. 9 is a diagram illustrating an example of an alert screen relating to the cooperation between the printing systems.

An example of an alert screen relating to cooperation between the printing systems using the CPSs is described with reference to FIG. 9. The system according to the present exemplary embodiment may allow a use mode in which the user manually set a tenant as the transmission destination of the print job (i.e., CPS used for printing). On the other hand, as described above, under the situation where the target print job is held by the CPS 01 associated with the in-house tenant, it is difficult for the CPS 02 associated with the share office tenant to refer to the print job.

In consideration of such a situation, in a case where a tenant other than the public tenant is selected as the transmission destination of the print job under the situation where the terminal apparatus 320 performs the remote connection, the information processing apparatus 310 may issue notification information such as an alert to the user. An alert screen 900 illustrated in FIG. 9 is an example of a screen for presenting the notification information to the user.

In the alert screen 900, an alert message 901 and a button 902 for receiving an instruction to determine the transmission destination of the job from the user are displayed. In the example illustrated in FIG. 9, as the alert message 901, an alert (notification information) notifying that a cooperating tenant (i.e., public tenant) is recommended as the transmission destination of the print job is displayed. If the button 902 indicating that transmission of the print job to the cooperating tenant is allowed is pressed, the transmission destination of the target print job is switched to the CPS 00 associated with the public tenant.

<Processing>

An example of the processing by the system according to the present exemplary embodiment is described with reference to FIG. 10 to FIG. 13.

First, an example of processing to set an account for the user 380 to use the system according to the present exemplary embodiment is described with reference to FIG. 10.

In step S1001, the terminal apparatus 320 requests the information processing system 500 (e.g., information processing apparatus 310) to which the terminal apparatus 320 performs the remote connection, to perform a procedure of sign-in to the CPS 00 associated with the cooperating tenant (public tenant).

In step S1002, the information processing system 500 redirects, to the CPS 00, the request about the procedure of sign-in to the CPS 00 received from the terminal apparatus 320 in step S1001.

In step S1003, the CPS 00 causes the terminal apparatus 320 to present an authentication screen for receiving input of authentication information used for the sign-in from the user 380.

In step S1004, the terminal apparatus 320 receives the input of authentication information from the user 380 via the authentication screen presented in step S1003, and transmits the authentication information to the CPS 00, thereby requesting the CPS 00 to authorize the target user 380.

In step S1005, the CPS 00 issues an authorization code for the target user 380 to the information processing system 500 based on the authentication information transmitted from the terminal apparatus 320 in step S1004.

In step S1006, the information processing system 500 requests the CPS 00 to issue an access token for the user 380 who is a target of the authorization code issued in step S1005.

In step S1007, the CPS 00 transmits the access token for the target user 380 to the information processing system 500 in response to the request from the information processing system 500 in step S1006.

In step S1008, the information processing system 500 requests the CPS 00 to transmit user information about the user 380 corresponding to the access token transmitted in step S1007.

In step S1009, the CPS 00 transmits, to the information processing system 500, the user information about the target user 380 in response to the request from the information processing system 500 in step S1008.

In step S1010, the information processing system 500 records, in a predetermined storage area (e.g., DB), the access token received in step S1007 and the user information received in step S1009 in association with each other.

As described above, the information processing system 500 manages the information (e.g., account) about the user 380 managed in the tenant of the company A and the account of the public tenant in association with each other. As a result, the information processing system 500 (e.g., CPS 01) can cause the CPS 00 associated with the public tenant to hold the print job by using the user information and the account managed in association with the user 380.

Next, as an example of print processing in response to the request from the terminal apparatus 320, processing to cause the corresponding CPS to hold the print job in order to cause an image forming apparatus to perform printing is particularly focused on and described with reference to FIG. 11 to FIG. 13.

Figure 11:
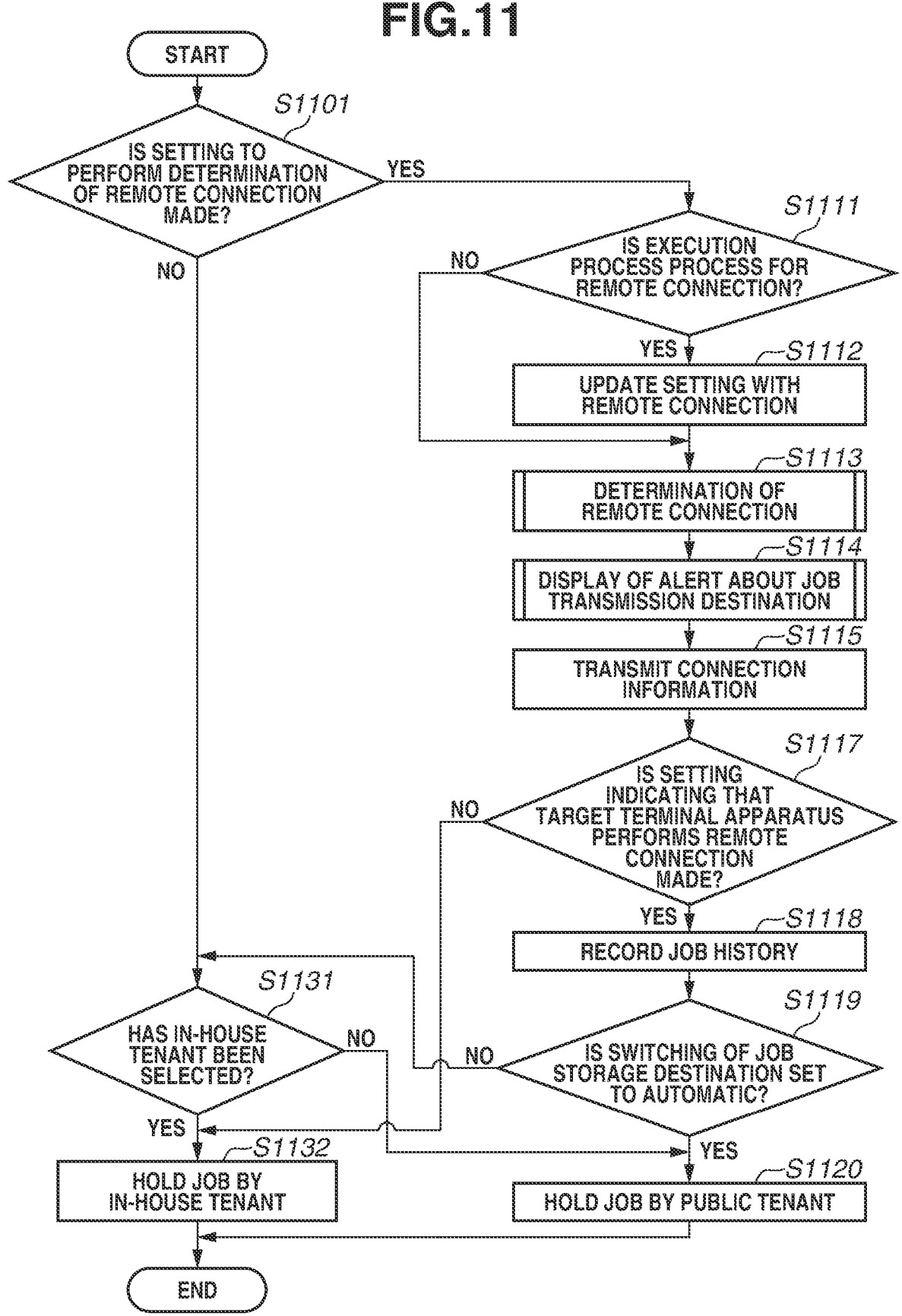
FIG. 11 is a flowchart illustrating an example of processing by a system.

First, description is given with reference to FIG. 11. In step S1101, the information processing apparatus 310 determines whether a setting to perform determination of remote connection is made.

In a case where the information processing apparatus 310 determines in step S1101 that the setting to perform determination of remote connection is made (YES in step S1101), the processing proceeds to step S1111.

In contrast, in a case where the information processing apparatus 310 determines in step S1101 that the setting not to perform determination of remote connection (NO in step S1101) is made, the processing proceeds to step S1131.

In step S1111, the information processing apparatus 310 determines whether an execution process based on an instruction from the target terminal apparatus 320 is a process for remote connection. For example, in the case where the OS of the information processing apparatus 310 is Windows®, the above-described determination can be performed with reference to Terminal Server Session property value of the OS from the client program 501 by using the API provided by the OS.

In a case where the information processing apparatus 310 determines that the execution process is the process for remote connection (YES in step S1111), the processing proceeds to step S1112.

In contrast, in a case where the information processing apparatus 310 determines that the execution process is not the process for remote connection (NO in step S1111), the processing proceeds to step S1113.

In step S1112, the information processing apparatus 310 records information indicating that the target terminal apparatus 320 performs the remote connection in the remote connection information 503. As a result, a setting indicating that the terminal apparatus 320 performs the remote connection is made on the remote connection information 503.

In step S1113, the information processing apparatus 310 performs the processing to determine whether the target terminal apparatus 320 performs the remote connection by checking whether the terminal apparatus 320 is present in the local network.

The processing in step S1113 is described in more detail with reference to FIG. 12.

In step S1201, the information processing apparatus 310 determines whether the setting indicating that the target terminal apparatus 320 performs the remote connection has been made by referring to the remote connection information 503.

In a case where the information processing apparatus 310 determines in step S1201 that the setting indicating that the target terminal apparatus 320 performs the remote connection has been made (YES in step S1201), the processing proceeds to step S1221.

In contrast, in a case where the information processing apparatus 310 determines in step S1201 that the setting indicating that the target terminal apparatus 320 performs the remote connection has not been made (NO in step S1201), the processing illustrated in FIG. 12 ends.

In step S1221, the information processing apparatus 310 acquires terminal information about the target terminal apparatus 320, from the terminal apparatus 320.

In step S1222, the information processing apparatus 310 checks whether the target terminal apparatus 320 is present in the local network based on the terminal information acquired in step S1221.

In step S1223, the information processing apparatus 310 determines whether the terminal apparatus 320 is present in the local network based on a result of checking of the terminal apparatus 320 in the local network in step S1222.

In a case where the information processing apparatus 310 determines in step S1223 that the terminal apparatus 320 is present in the local network (YES in step S1223), the processing proceeds to step S1224.

In contrast, in a case where the information processing apparatus 310 determines in step S1223 that the terminal apparatus 320 is not present in the local network (NO in step S1223), the processing illustrated in FIG. 12 ends.

In step S1224, the information processing apparatus 310 deletes the information indicating that the target terminal apparatus 320 performs the remote connection from the remote connection information 503. As a result, the setting indicating that the terminal apparatus 320 performs the remote connection, made to the remote connection information 503 in step S1112, is canceled.

The description is continued by referring back to FIG. 11.

In step S1114, the information processing apparatus 310 performs processing to display an alert about the transmission destination of the job.

The processing in step S1114 is described in more detail with reference to FIG. 13.

In step S1301, the information processing apparatus 310 determines whether the setting indicating that the target terminal apparatus 320 performs the remote connection has been made by referring to the remote connection information 503.

In a case where the information processing apparatus 310 determines in step S1301 that the setting indicating that the target terminal apparatus 320 performs the remote connection has been made (YES in step S1301), the processing proceeds to step S1310.

In contrast, in a case where the information processing apparatus 310 determines in step S1301 that the setting indicating that the target terminal apparatus 320 performs the remote connection has not been made (NO in step S1301), the processing illustrated in FIG. 13 ends.

In step S1310, the information processing apparatus 310 determines whether switching of the storage destination of the job (e.g., print job) is set to automatic switching.

In a case where the information processing apparatus 310 determines in step S1310 that the switching of the storage destination of the job is not set to automatic switching (NO in step S1310), the processing proceeds to step S1311.

In contrast, in a case where the information processing apparatus 310 determines in step S1310 that the switching of the storage destination of the job is set to automatic switching (YES in step S1310), the processing illustrated in FIG. 13 ends.

In step S1311, the information processing apparatus 310 determines whether the user has selected the public tenant (i.e., CPS associated with the public tenant) as the storage destination of the job.

In a case where the information processing apparatus 310 determines that the user has selected the public tenant as the storage destination of the job (YES in step S1311), the processing illustrated in FIG. 13 ends.

In contrast, in a case where the information processing apparatus 310 determines in step S1311 that the user has not selected the public tenant as the storage destination of the job (NO in step S1311), the processing proceeds to step S1312.

In step S1312, the information processing apparatus 310 causes the terminal apparatus 320 to display an alert message about the transmission destination of the job, thereby presenting the alert message to the user. As a specific example, the alert screen 900 described with reference to FIG. 9 is used to present the above-described alert message to the user.

In step S1313, the information processing apparatus 310 updates the storage destination of the job in response to an instruction from the user who has received presentation of the alert message in step S1312. For example, the alert screen 900 described with reference to FIG. 9 is used to receive the instruction from the user.

The description is continued by referring back to FIG. 11.

In step S1115, the information processing apparatus 310 transmits the remote connection information 503 to the CPS 01 associated with the in-house tenant of the company A.

In step S1117, the CPS 01 determines whether the setting indicating that the target terminal apparatus 320 performs the remote connection has been made by referring to the remote connection information 503 transmitted from the information processing apparatus 310 in step S1115.

In a case where the CPS 01 determines in step S1117 that the setting indicating that the target terminal apparatus 320 performs the remote connection has been made (YES in step S1117), the processing proceeds to step S1118.

In contrast, in a case where the CPS 01 determines in step S1117 that the setting indicating that the target terminal apparatus 320 performs the remote connection has not been made (NO in step S1117), the processing proceeds to step S1132.

In step S1118, the CPS 01 records information indicating that the target terminal apparatus 320 performs the remote connection in predetermined history information (e.g., print history), based on a result of the determination in step S1117. Examples of the history information include the print history 800 illustrated in FIG. 8.

In step S1119, the information processing apparatus 310 determines whether the switching of the storage destination of the job (e.g., print job) is set to automatic switching.

In a case where the information processing apparatus 310 determines in step S1119 that the switching of the storage destination of the job is set to automatic switching (YES in step S1119), the processing proceeds to step S1120.

In contrast, in a case where the information processing apparatus 310 determines in step S1119 that the switching of the storage destination of the job is not set to the automatic switching (NO in step S1119), the processing proceeds to step S1131.

In step S1120, the CPS 01 transmits the job (e.g., print job) transmitted from the information processing apparatus 310 in response to the request from the terminal apparatus 320 to the CPS 00 associated with the public tenant, thereby causing the CPS 00 to hold the job. In this case, for example, in response to the request from the CPS 02 associated with the share office tenant, the print job held by the CPS 00 is transmitted to the MFP 322 installed in the environment 321 of the share office via the CPS 02. Then, the MFP 322 performs print processing based on the print job.

In contrast, in step S1131, the CPS 01 determines whether the CPS 01 associated with the in-house tenant has been selected by the user as the storage destination of the job (e.g., print job) that is transmitted from the information processing apparatus 310 in response to the request from the terminal apparatus 320.

In a case where the CPS 01 determines in step S1131 that the CPS 01 associated with the in-house tenant has been selected as the storage destination of the job (YES in step S1131), the processing proceeds to step S1132.

In contrast, in a case where the CPS 01 determines in step S1131 that the CPS 01 associated with the in-house tenant has not been selected as the storage destination of the job (NO in step S1131), the processing proceeds to step S1120.

In step S1132, the CPS 01 holds the job (e.g., print job) transmitted from the information processing apparatus 310 in response to the request from the terminal apparatus 320. In this case, for example, in response to the request from the MFP 312 installed in the in-house environment 311, the print job held by the CPS 01 is transmitted to the MFP 312. Then, the MFP 312 performs print processing based on the print job.

Exemplary embodiments of the present disclosure enable cooperation between the plurality of printing systems in a more suitable mode.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-068924, filed Apr. 15, 2021, which is hereby incorporated by reference herein in its entirety.

What is claimed is:

1. A system, comprising:
an information processing apparatus; and
a first cloud print service configured to cooperate with the information processing apparatus,
wherein the information processing apparatus includes first one or more memories storing a first set of instructions, and first one or more processors that execute the first set of instructions to:
receive remote connection from a client terminal;
determine whether the client terminal that performs remote connection to the information processing apparatus is present in a local network to which the information processing apparatus is connected;
receive a print request from the client terminal; and
transmit a result of the determination and print job data corresponding to the print request to the first cloud print service,
wherein the first cloud print service includes second one or more memories storing a second set of instructions, and second one or more processors that execute the second set of instructions to:
in a case where the transmitted result of the determination indicates that the client terminal is not present in the local network to which the information processing apparatus is connected, transmit the print job data received from the information processing apparatus to a second cloud print service; and
in a case where the transmitted result of the determination indicates that the client terminal is present in the local network to which the information processing apparatus is connected, hold the print job data transmitted from the information processing apparatus in the first cloud print service.

2. The system according to claim 1,
wherein the first one or more processors further execute the first set of instructions to acquire terminal information about the client terminal from the client terminal, and
wherein whether the client terminal is present in the local network or not is determined based on the acquired terminal information.

3. The system according to claim 1, wherein the second one or more processors further execute the second set of instructions to record information indicating the result of the determination transmitted from the client terminal in association with history of processing for the print job data.

4. The system according to claim 1, wherein the first one or more processors further execute the first set of instructions to, in a case where the second cloud print service is not selected by a user as a cloud print service to hold the print job data and it is determined that the client terminal is not present in the local network, output notification information to a predetermined output destination.

5. A method of controlling a system including an information processing apparatus and a first cloud print service, the method comprising:
receiving, by the information processing apparatus, remote connection from a client terminal;
determining, by the information processing apparatus, whether the client terminal that performs remote connection to the information processing apparatus is present in a local network to which the information processing apparatus is connected;
receiving a print request from the client terminal;
transmitting, by the information processing apparatus, a result of the determination and print job data corresponding to the print request to the first cloud print service;
in a case where the transmitted result of the determination indicates that the client terminal is not present in the local network to which the information processing apparatus is connected, transmitting, by the first cloud print service, the print job data received from the information processing apparatus to a second cloud print service; and
in a case where the transmitted result of the determination indicates that the client terminal is present in the local network to which the information processing apparatus is connected, holding the print job data transmitted from the information processing apparatus in the first cloud print service.

* * * * *